United States Patent
Wielard et al.

(10) Patent No.: US 12,361,401 B2
(45) Date of Patent: Jul. 15, 2025

(54) SYSTEM AND METHOD FOR AUTHENTICATING A USER OF A BANKING DEVICE

(71) Applicant: Glory Ltd., Hyogo (JP)

(72) Inventors: Douglas Wielard, Grandville, MI (US); Snehal Vashi, Atlanta, GA (US); Rodney Smith, Marietta, GA (US); David Page, Alpharetta, GA (US); Lisa Marie Foley, Atlanta, GA (US); Russell Brackett, Powder Springs, GA (US)

(73) Assignee: GLORY LTD., Hyogo (JP)

( * ) Notice: Subject to any disclaimer, the term of this patent is extended or adjusted under 35 U.S.C. 154(b) by 20 days.

(21) Appl. No.: 17/351,247

(22) Filed: Jun. 18, 2021

(65) Prior Publication Data

US 2022/0405731 A1    Dec. 22, 2022

(51) Int. Cl.
| | |
|---|---|
| G06Q 20/02 | (2012.01) |
| G06Q 20/10 | (2012.01) |
| G06Q 20/20 | (2012.01) |
| G06Q 20/32 | (2012.01) |
| G06Q 20/40 | (2012.01) |
| G06Q 40/02 | (2023.01) |
| H04L 9/40 | (2022.01) |
| G06Q 20/18 | (2012.01) |

(52) U.S. Cl.
CPC ......... *G06Q 20/3223* (2013.01); *G06Q 20/02* (2013.01); *G06Q 20/105* (2013.01); *G06Q 20/1085* (2013.01); *G06Q 20/202* (2013.01); *G06Q 20/204* (2013.01); *G06Q 20/4014* (2013.01); *G06Q 40/02* (2013.01); *H04L 63/083* (2013.01); *H04L 63/0853* (2013.01); *G06Q 20/18* (2013.01)

(58) Field of Classification Search
CPC .. G06Q 20/3223; G06Q 20/02; G06Q 20/105; G06Q 20/1085; G06Q 20/202; G06Q 20/204; G06Q 20/4014; G06Q 20/18; H04L 63/083; H04L 63/0853
USPC ......................................... 705/43
See application file for complete search history.

(56) References Cited

U.S. PATENT DOCUMENTS

| | | | |
|---|---|---|---|
| 10,402,803 B1 * | 9/2019 | Prasad | G06Q 20/40 |
| 11,037,114 B2 * | 6/2021 | Kuchenski | G07F 9/001 |
| 11,037,127 B2 * | 6/2021 | Dadhaniya | G07F 19/203 |
| 11,151,555 B2 * | 10/2021 | Hudson | G06Q 20/385 |
| 11,348,077 B2 * | 5/2022 | Naik | G06Q 20/1085 |
| 11,847,649 B2 * | 12/2023 | Fisher | G06Q 20/102 |
| 2011/0196731 A1 * | 8/2011 | Christie | G06Q 30/0225 726/6 |

(Continued)

FOREIGN PATENT DOCUMENTS

WO    WO 2016100965 A1 *    6/2016    ............. G06Q 20/32

*Primary Examiner* — Hani M Kazimi
(74) *Attorney, Agent, or Firm* — XSENSUS LLP

(57) ABSTRACT

A banking device in accordance with the present disclosure includes processing circuitry that is configured to receive user authentication information from a mobile device of a user interacting with the mobile device. The user authentication information may include a token indicating that the user of the mobile device is authenticated. The processing circuitry is further configured to contact, in response to reception of the user authentication information a banking server to initiate a banking transaction; and initiate the banking transaction.

11 Claims, 12 Drawing Sheets

(56) References Cited

U.S. PATENT DOCUMENTS

| | | | |
|---|---|---|---|
| 2013/0124410 A1* | 5/2013 | Kay | G07F 19/211 |
| | | | 705/43 |
| 2013/0159195 A1* | 6/2013 | Kirillin | H04L 63/105 |
| | | | 705/71 |
| 2014/0351125 A1* | 11/2014 | Miller | G06Q 40/02 |
| | | | 235/379 |
| 2015/0025874 A1* | 1/2015 | Matute | H04W 12/068 |
| | | | 704/4 |
| 2016/0092869 A1* | 3/2016 | Salama | G06Q 20/326 |
| | | | 705/41 |
| 2018/0232740 A1* | 8/2018 | Brown | G06F 21/32 |
| 2021/0012339 A1* | 1/2021 | Rafferty | G06Q 20/3223 |
| 2021/0035149 A1* | 2/2021 | Fisher | G06Q 30/0277 |
| 2021/0295304 A1* | 9/2021 | Iqbal | G06Q 20/3224 |

* cited by examiner

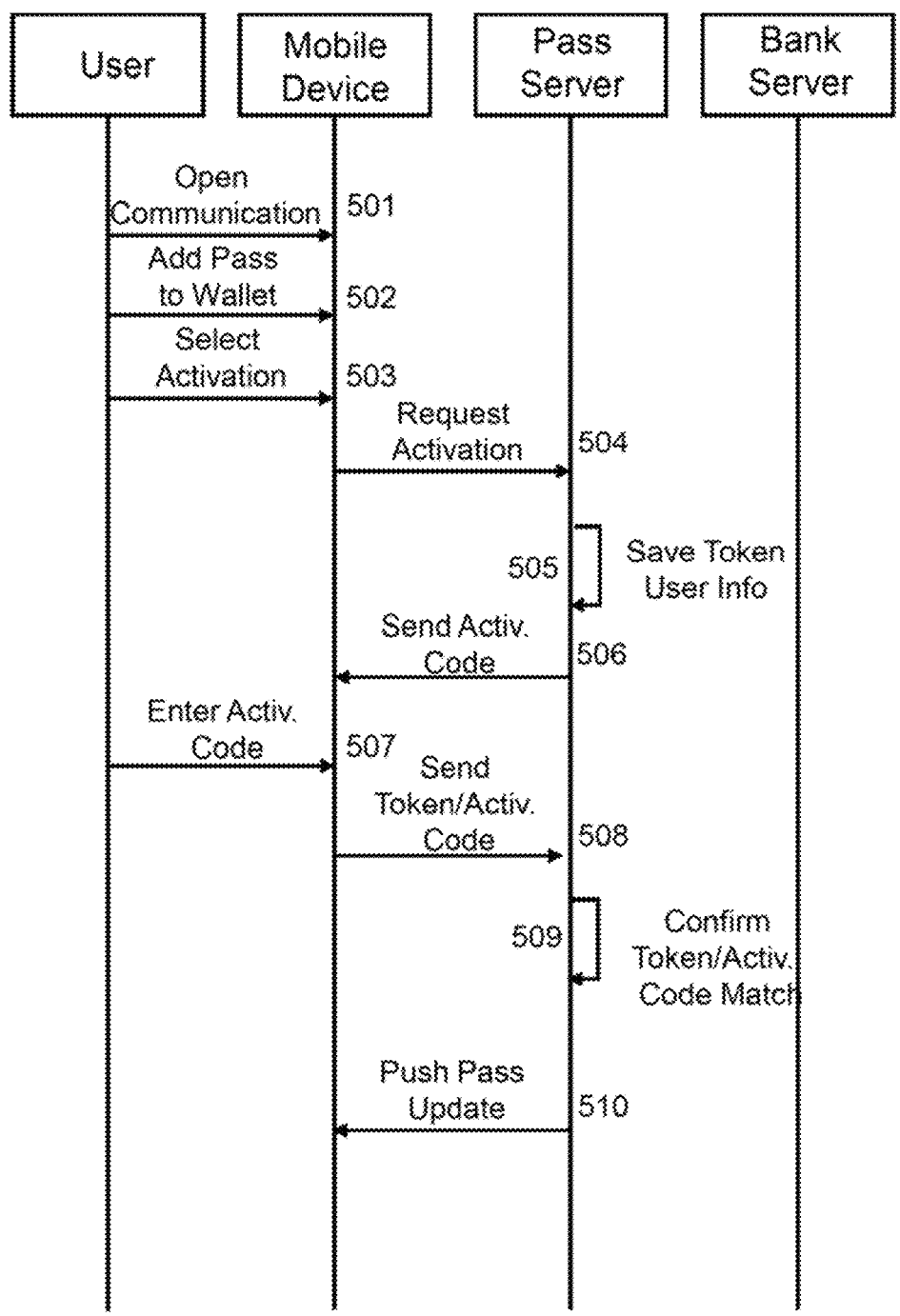

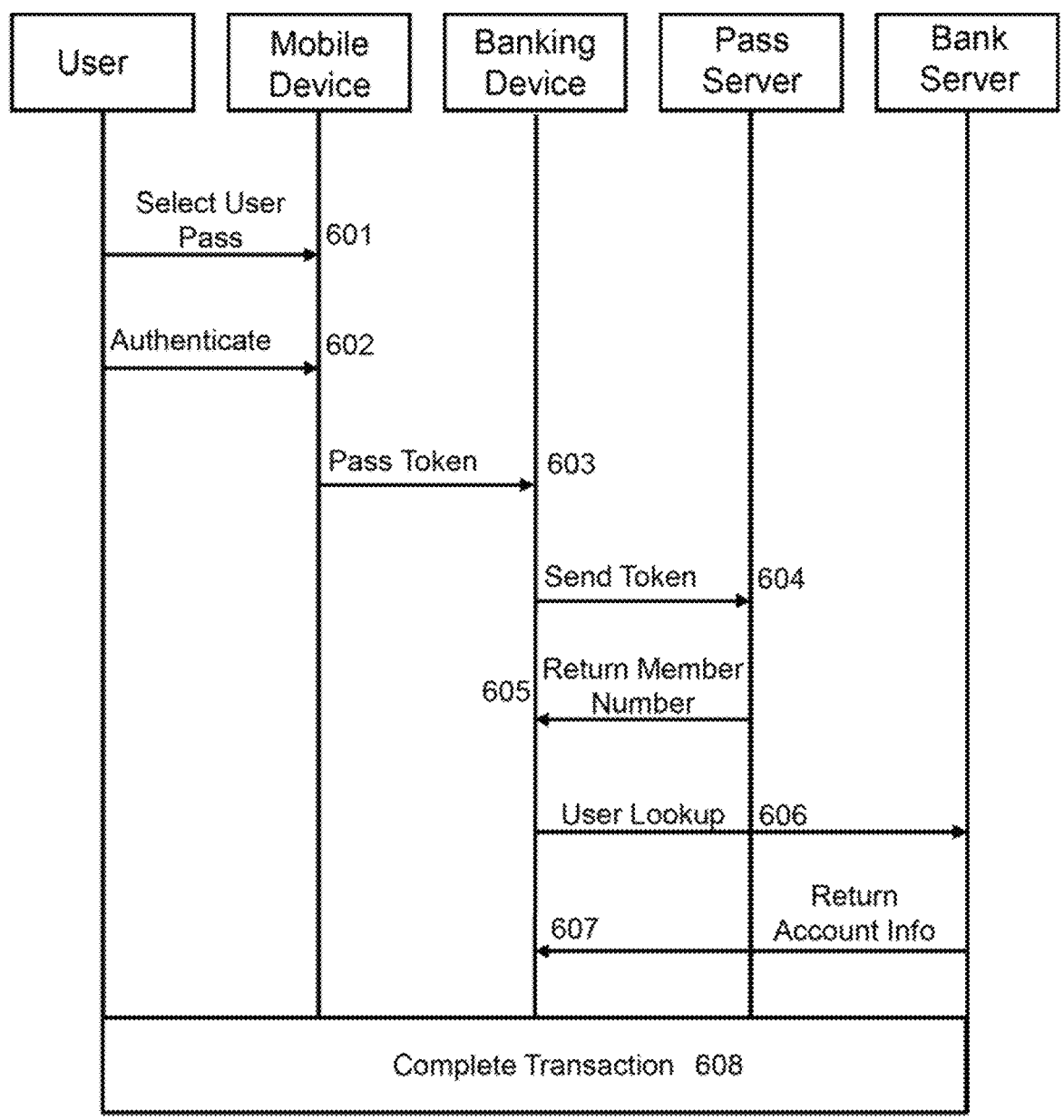

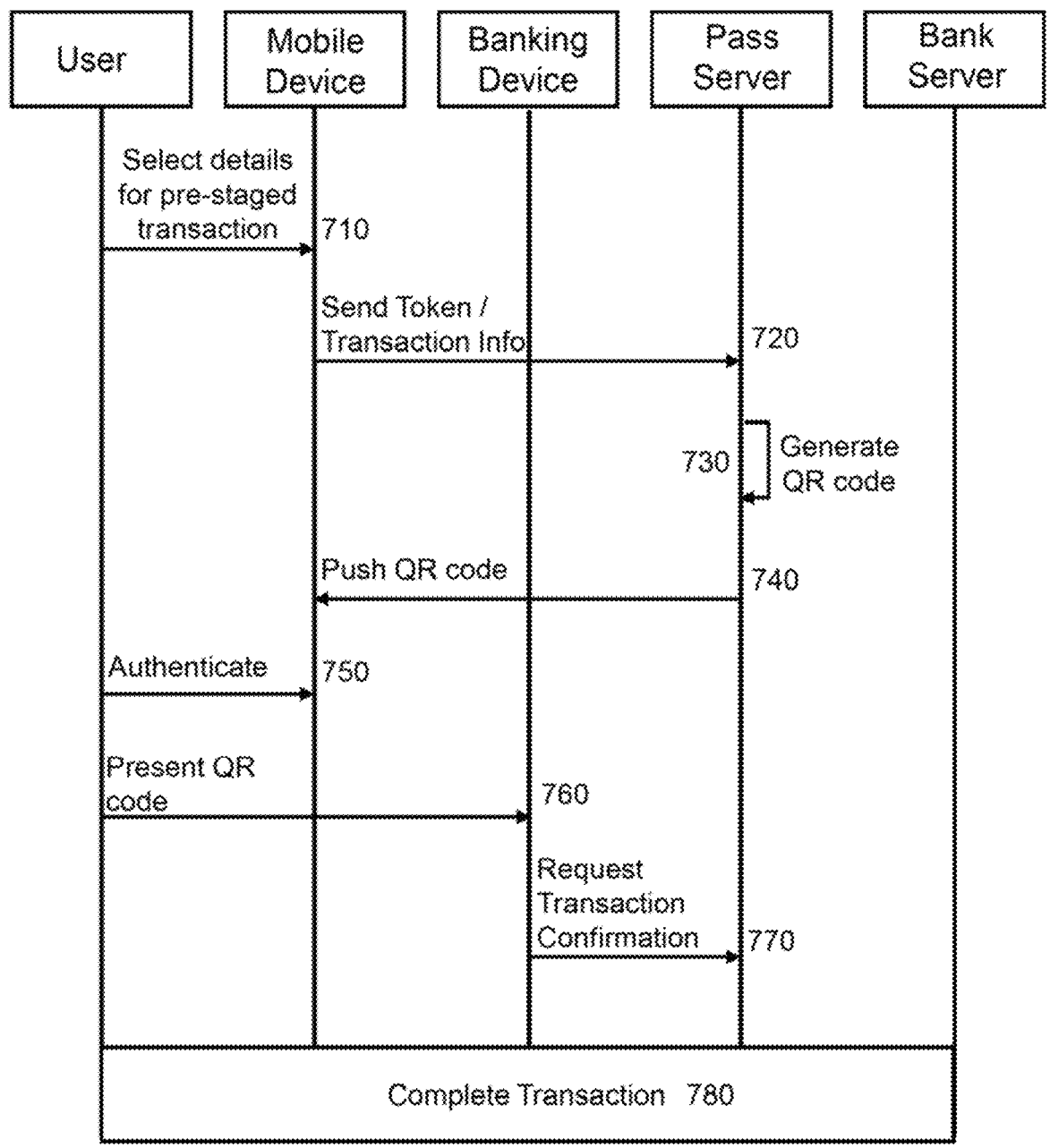

SYSTEM AND METHOD FOR AUTHENTICATING A USER OF A BANKING DEVICE

BACKGROUND

Automated teller machine (ATM) networks enable financial card holders to initiate transactions with their financial card at an ATM belonging to another financial institution.

However, functionality permitted at an ATM via the ATM network is limited. Limits to withdrawal amount, number of transactions and accessible account types are common limitations imposed at ATMs for transactions performed via an ATM network.

SUMMARY

In an exemplary implementation of the present application, a banking device in includes processing circuitry that is configured to receive user authentication information from a mobile device of a user interacting with the mobile device. The processing circuitry is further configured to contact, in response to reception of the user authentication information, a banking server to initiate a banking transaction; and initiate the banking transaction.

In another exemplary implementation of the present application, a banking method comprises receiving, by processing circuitry of a banking device, user authentication information from a mobile device of a user interacting with the mobile device; contacting, in response to reception of the user authentication information a bank server to initiate a banking transaction; and initiating the banking transaction.

In another exemplary implementation of the present application, a banking method comprises transmitting user information, for authenticating a user, to a bank server; receiving, from the bank server, a member identifier corresponding to the user information; displaying, in response to receiving the member identifier, a prompt to request a user pass; requesting the user pass in response to selection of the prompt; and receiving the user pass to save to a mobile device of the user.

BRIEF DESCRIPTION OF THE DRAWINGS

FIG. 5 illustrates an activation process sequence for activating a user pass in accordance with the present disclosure.

FIG. 6 illustrates an authentication process sequence for authenticating a user pass in accordance with the present disclosure.

FIG. 7B illustrates another pre-staging transaction completion process in accordance with the present disclosure.

DETAILED DESCRIPTION OF THE DRAWINGS

Figure 1:
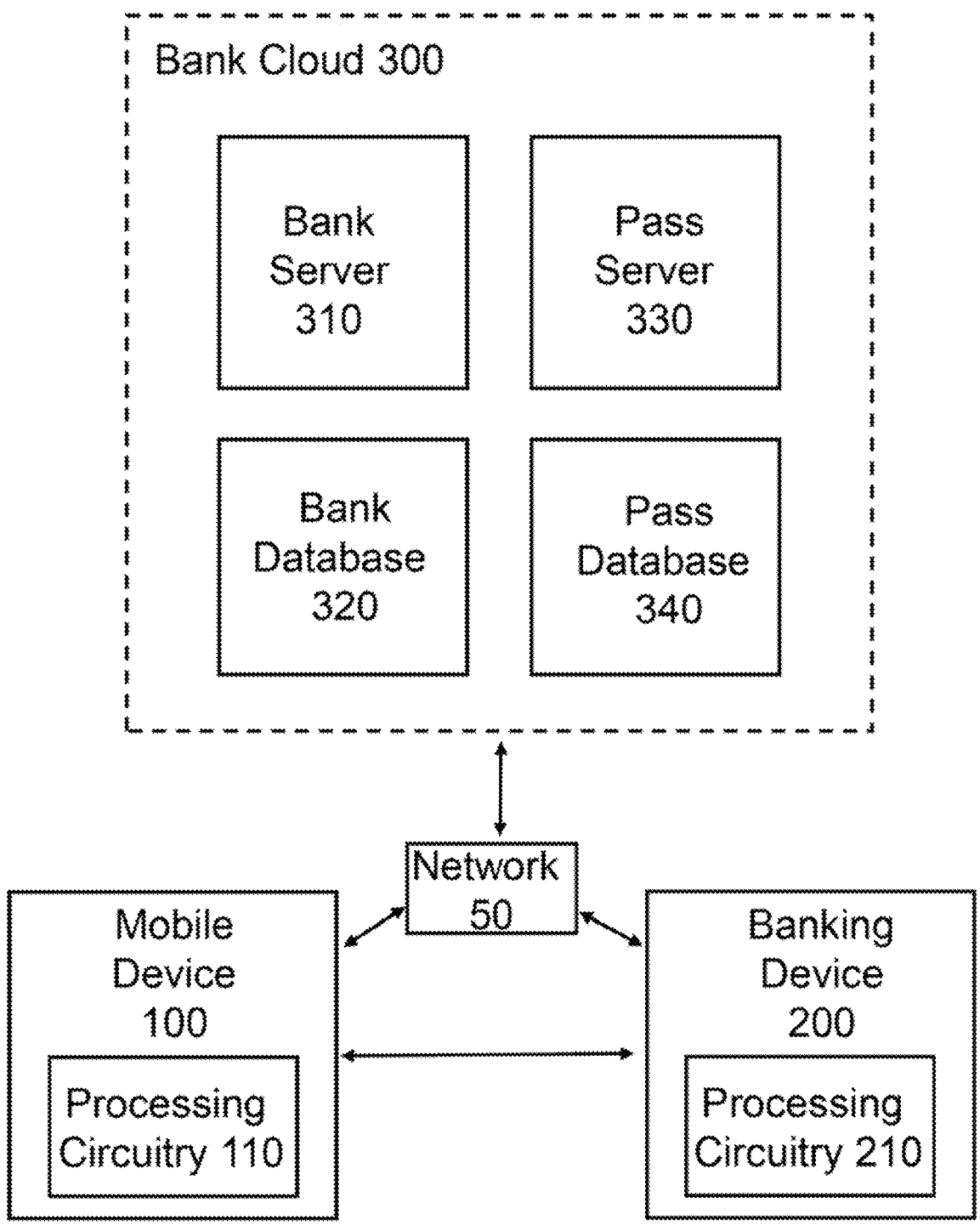
FIG. 1 is a block diagram of a banking system in accordance with the present disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation. Furthermore, as used herein the terms "circuit" or "circuitry" means one or more circuits, including discrete circuit(s) as well as circuit board(s) and combinations thereof.

The various elements, features, and processes described herein may be used independently of one another or may be combined in various ways. All possible combinations and sub-combinations are intended to fall within the scope of this disclosure.

Moving onto discussion of the drawings, the inventors of the present disclosure have recognized limitations in traditional ATMs and ATM networks. The inventors of the present disclosure have developed systems and processes in which customers may complete banking transactions by initiating a procedure between the customers own mobile device and a banking device, such as an ATM, self-serve banking kiosks or teller-serviced banking kiosks. This procedure is a direct banking transaction between the customer and the banking core of the bank, without use of the ATM network or of a customer card and PIN. The procedure utilizes authentication and security protocols of the customer's mobile device to verify the identity of the customer as well as to authenticate of the transaction with the banking device.

Moreover, the inventors of the present disclosure have recognized that these systems and processes to pre-stage transactions. The customer may use their mobile device to generate a transaction order, at any time and mobile from proximity to the banking device. The transaction may be completed at a later time when the customer is authenticated by the banking device. Additional details relating to pre-staging transactions will be provided below with reference to FIGS. 7A and 7B.

FIG. 1 is a block diagram of a banking system in accordance with the present disclosure. FIG. 1 illustrates an exemplary banking system 10, in which mobile device 100 interacts with banking device 200 and components of bank cloud 300. In an exemplary implementation, bank cloud 300 may include bank server 310, bank database 320, pass server 330 and pass database 340. In other implementations, bank cloud 300 may include one or more of bank server 310 and bank database 320 and pass server 330 and pass database 340 are separate from bank cloud 300. In such implementations, mobile device 100 may interact with pass server 330 and pass database 340 via network 50, or mobile device 100 may interact with pass server 330 and pass database 340 via communication through bank cloud 300. Functionality of bank server 310, bank database 320, pass server 330 and pass database 340 will be discussed later.

Mobile device 100 may communicate directly with banking device 200 or mobile device 100 may communicate with banking device 200 via network 50. Mobile device 100 includes processing circuitry 110 and banking device 200 includes processing circuitry 210. Additional structural details of mobile device 100, processing circuitry 110, banking device 200 and processing circuitry 210 will be provided later with respect to FIGS. 2 and 3.

In an exemplary implementation, mobile device 100 is a smartphone or personal computer that is property of a user. However, mobile device 100 need not be the property of a user, but instead could be rented, assigned, or otherwise occupied by the user.

In an exemplary implementation, banking device 200 is an ATM, terminal or kiosk in which customers may interact in order to perform banking procedures, such as deposit, withdrawal, transfer or payment. In the exemplary implementation, the banking device 200 is located at a bank, credit union or other financial institution. From this point on, the disclosure will refer to the location as a bank. However, the present disclosure is not limited to the location of banking device 200, and banking device 200 may be located at a store, a stadium, a casino, residence, government building, school or other non-financial institutions.

In an exemplary implementation, the user is a customer of a bank. The bank utilizes banking device 200 to complete in person self-service banking procedures and banking transactions. The bank utilizes bank cloud 300 to initiate, complete, track and store records of banking procedures.

To initiate a banking procedure, the user may interact with banking device 200. Mobile device 100 is used to authenticate the user. After authentication, the banking procedure is completed via banking device 200.

In other implementations, the user may interact with mobile device 100 to initiate a banking procedure and authenticate the user. Mobile device 100 then communicates with banking device 200 in order to complete the transaction. This communication may be performed directly between mobile device 100 and banking device 200 or via network 50.

In order to authenticate the user and complete banking procedures, mobile device 100 and banking device 200 communicate with bank cloud 300 via network 50.

Figure 2:
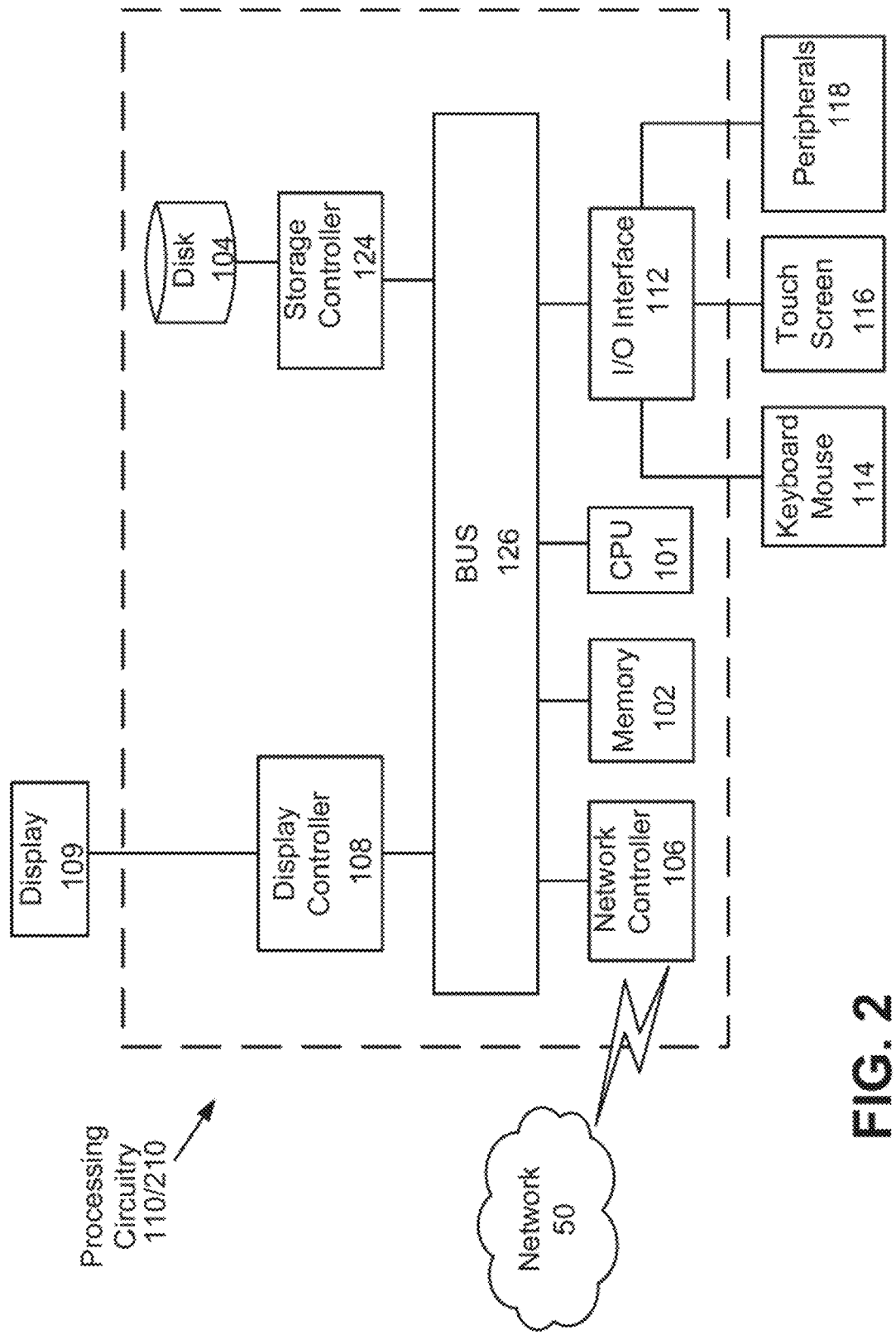
FIG. 2 is a block diagram of processing circuitry that performs computer-based operations in accordance with the present disclosure.

FIG. 2 is a block diagram of processing circuitry that performs computer-based operations in accordance with the present disclosure. FIG. 2 illustrates processing circuitry 110 of mobile device 100. Additionally, discussion of processing circuitry with respect to FIG. 2 also corresponds to processing circuitry 210 of banking device 200.

Processing circuitry 110/210 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 2, the processing circuitry 110/210 includes a CPU 101 which performs one or more of the control processes discussed in this disclosure. The process data and instructions may be stored in memory 102. These processes and instructions may also be stored on a storage medium disk 104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 110/210 communicates, such as a server or computer. The processes may also be stored in network based storage, cloud-based storage or other mobile accessible storage and executable by processing circuitry 110/210.

Further, the claimed advancements may be provided as a utility application, background daemon, or component of an operating system, or combination thereof, executing in conjunction with CPU 101 and an operating system such as Microsoft Windows, UNIX, Solaris, LINUX, Apple MAC-OS, Apple iOS and other systems known to those skilled in the art.

The hardware elements in order to achieve the processing circuitry 110/210 may be realized by various circuitry elements. Further, each of the functions of the above described embodiments may be implemented by circuitry, which includes one or more processing circuits. A processing circuit includes a particularly programmed processor, for example, processor (CPU) 101, as shown in FIG. 2. A processing circuit also includes devices such as an application specific integrated circuit (ASIC) and conventional circuit components arranged to perform the recited functions.

In FIG. 2, the processing circuitry 110/210 may be a general-purpose computer or a particular, special-purpose machine. In one embodiment, the processing circuitry 110 is programmed to execute processing to control mobile device 100. Processing circuitry 210 is programmed to execute processing to control banking device 200. The processing circuitry 110 of mobile device 100 and the processing circuitry 210 of banking device 200 may be in or locally communicable to bank cloud 300.

Alternatively, or additionally, the CPU 101 may be implemented on an FPGA, ASIC, PLD or using discrete logic circuits, as one of ordinary skill in the art would recognize. Further, CPU 101 may be implemented as multiple processors cooperatively working in parallel to perform the instructions of the inventive processes described above.

The processing circuitry 110/210 in FIG. 2 also includes a network controller 106, such as an Ethernet PRO network interface card, for interfacing with network 50. As can be appreciated, the network 50 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 50 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 106 may be compliant with other direct communication standards, such as Bluetooth, a near field communication (NFC), infrared ray or other.

The processing circuitry 110/210 further includes a display controller 108, such as a graphics card or graphics adaptor for interfacing with display 109, such as a monitor. A general purpose I/O interface 112 interfaces with a keyboard and/or mouse 114 as well as a touch screen panel 116 on or separate from display 109. General purpose I/O interface also connects to a variety of peripherals 118 including a printer and an optical imaging device.

The storage controller 124 connects the storage medium disk 104 with communication bus 126, which may be an ISA, EISA, VESA, PCI, or similar, for interconnecting all of the components of the processing circuitry 110/210. A description of the general features and functionality of the display 109, keyboard and/or mouse 114, as well as the display controller 108, storage controller 124, network controller 106, and general purpose I/O interface 112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Figure 3:
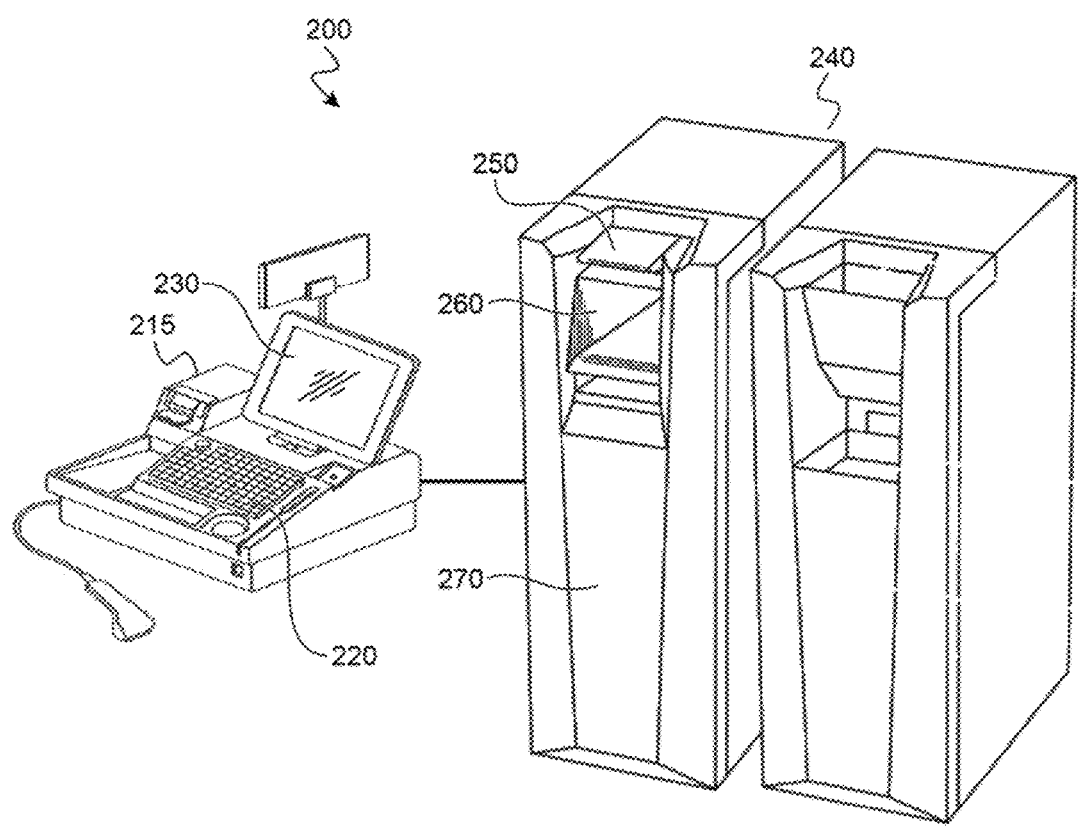
FIG. 3 is an external view of an exemplary banking device in accordance with the present disclosure.

FIG. 3 is an external view of an exemplary banking device in accordance with the present disclosure. In particular, FIG. 3 is an external view of an example of the banking device 200. The banking device 200 shown in FIG. 3 includes teller device 215 and a banknote handling unit 240. The teller device 215 includes the operation unit 220 and the display unit 230. In some implementations, banking device 200 may be have single structure, including processing circuitry 210, teller device 215, banknote handling unit 240. In other implementations, banknote handling unit 240 may be separate from teller device 215.

The banknote handling unit 240 has an inlet 250 from which banknotes are deposited, and an outlet 260 from which banknotes are dispensed. The banknote handling unit 240 has a cover 270 at a front surface thereof.

In an exemplary implementation, teller device 215 may include a touch panel for touch interaction by a user. The user may select particular banking procedures to execute via banking device 200. In other implementations, a keyboard, voice input or other interface may be provided for user interaction.

The teller device 215, the banknote handling unit 240 are communicably connected to each other. The banknote handling unit 240 perform a depositing process in which money is deposited by a customer. The banknote handling unit 240 inputs, to processing circuitry 210, the amount of deposited money obtained by recognizing and counting the deposited money in the depositing process. In some implementations, deposits may be performed via other inputs, such as the input of a personal check, certified check, money order, or other recognized monetary transaction.

The banknote handling unit 240 may also perform the dispensing of currency to a customer. Upon completion of a transaction, the banknote handling unit 240 may dispense currency via instruction from processing circuitry 210.

Figure 4:
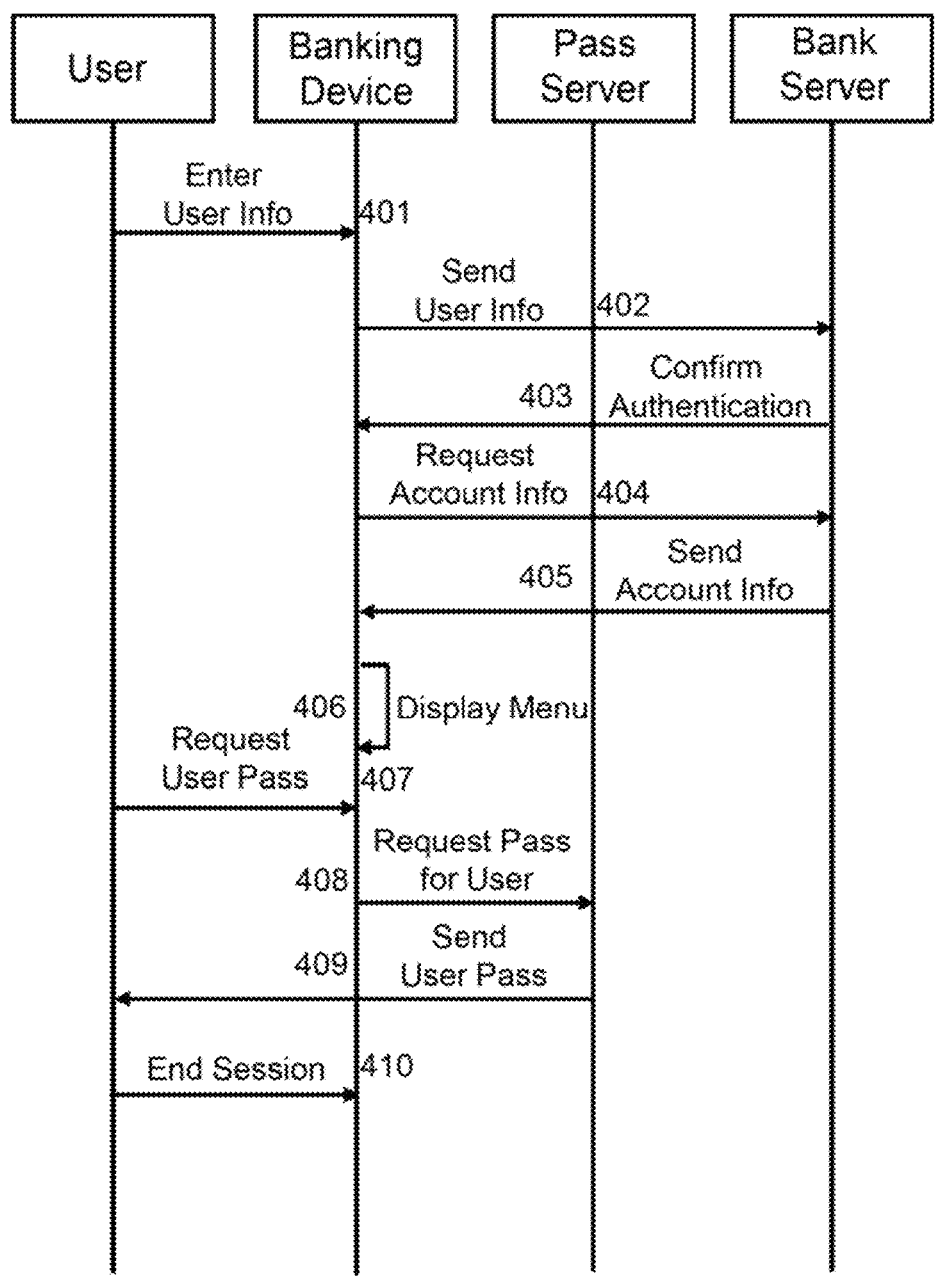
FIG. 4 illustrates a registration process sequence for registering a user identifier in accordance with the present disclosure.

FIG. 4 illustrates a registration process sequence for registering a user identifier in accordance with the present disclosure. The registration process begins at step 401, where a user enters a user information into banking device 200. The user information may be information that identifies the user or the user's account with the bank, such as a user name, account number, member number, loyalty number, phone number, home address, email address, social security number, or other identifier. Security information to authenticate the user's identity may also be provided, such as a password, PIN or other securely provided information to authenticate the user's identity. In other implementations, the user may register by entering the user information into a computer or other device, website or other portal affiliated with the bank separate from banking device 200.

At step 402, the banking device 200 sends the user information to bank server 310 for authentication via network 50. The bank server 310 may authenticate the user information by referring to bank database 320. In a case that the bank server authenticates the user information, at step 403 the bank server 310 sends a confirm authentication message to the banking device 200. In a case that the user information is not authenticated, the process ends.

At step 404, after receiving the confirm authentication message, the banking device 200 requests account information from the bank server 310. At step 405, the bank server 310 sends the requested account information to banking device 200 via network 50. The bank server 310 may retrieve the account information from bank database 320 and send it to banking device 200. In some implementations, the bank server 310 may retrieve the account information when it accesses bank database 320 for user authentication. Examples of account information that is retrieved and sent to banking device 200 include user account number, user name, bank account types and identifiers, and bank account balances, but is not limited thereto.

Figure 8:
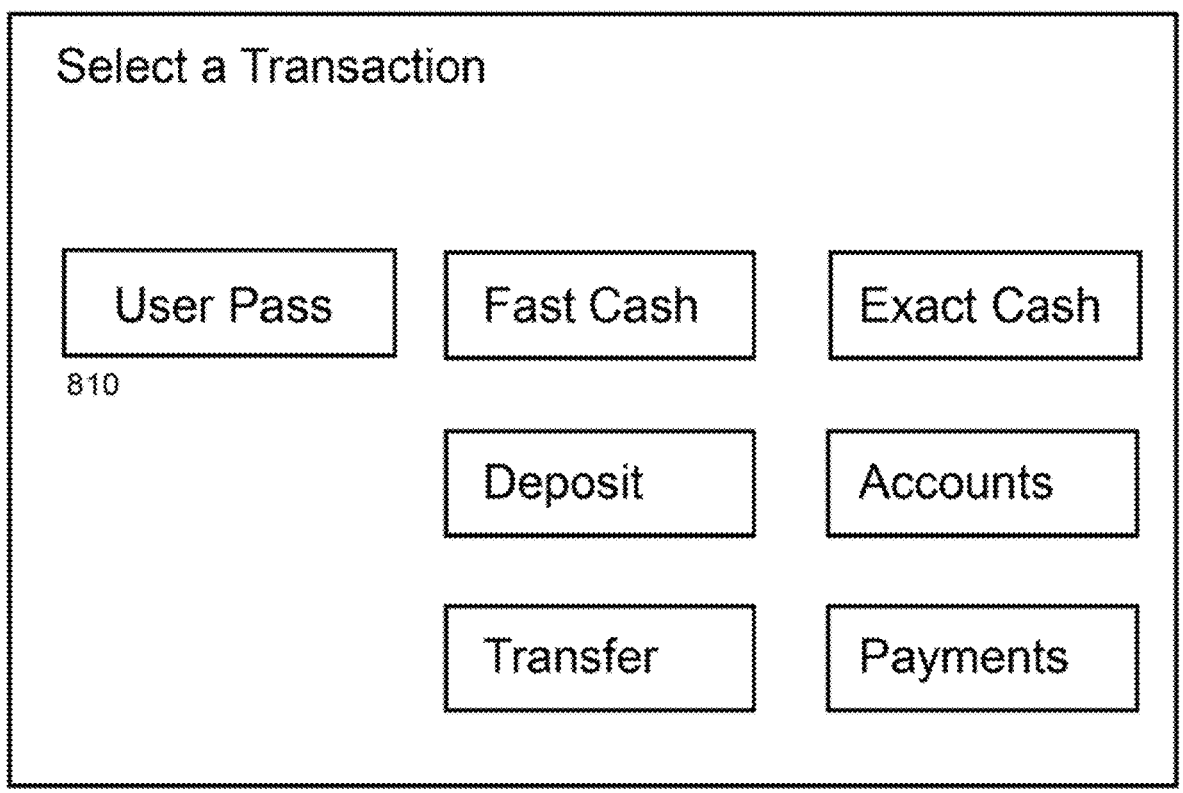
FIG. 8 illustrates a block diagram of an exemplary display of a banking device in accordance with the present disclosure.

At step 406, banking device 200 displays an interactive menu to the user. An exemplary interactive menu is illustrated in FIG. 8. As shown in FIG. 8, interactive menu 800 includes a number of banking procedure options for the user. In particular, interactive menu includes a selectable option for User Pass 810.

At step 407, the user requests a wallet pass by selecting User Pass 810. User Pass 810 is selected by the user via touch screen interface, keyboard, push button, audio input or other input interface of banking device 200.

At step 408, banking device 200 transmits a request for a user pass for the user to pass server 330. In an exemplary implementation, banking device 200 transmits the request by sending user information of the user to pass server 330 via network 50. The user information may include information such as member number, loyalty number, phone number or email address. The pass server 330 may store the user information in pass database 340.

In an exemplary implementation, the pass server 330 may generate a user pass for the user in response to receiving the request from banking device 200. In other implementations, the user pass may be pre-generated, prior to the pass server 330 receiving the request, and stored in pass database 340.

In an exemplary implementation, an authorized user pass mobile device 100 allows a user of mobile device 100 to complete expedited banking procedures with banking device 200. Additional details of the expedite banking procedures are discussed later with respect to FIG. 6.

In step 409, pass server 330 sends a communication to provide the user pass to the user. In an exemplary implementation, the pass server 330 sends the user pass to the user via the email directed to the email address provided in the user information. Alternatively, the pass server 330 may send the user pass to the user via text message to the phone number provided in the user information. In other embodiments, the pass server 330 may generate a QR code for display by banking device 200, and the user may access the user pass by scanning the QR code with mobile device 100. In another embodiment, the pass server 330 may send a hyperlink to the user via email or text message. After the user has received the user pass, the registration process is complete at step 410.

FIG. 5 illustrates an activation process sequence for activating a user pass in accordance with the present disclosure. The activation process beings at step 501, where the user opens the communication sent at step 409 of the registration process. In an exemplary implementation, the user opens the communication via mobile device 100. If the communication sent by pass server 330 was an email or text message including a hyperlink, the user instructs mobile device 100 to open the hyperlink. If the communication sent by pass server 330 was a QR code for display by banking device 200, the user instructs mobile device 100 to scan the QR code in order to open the hyperlink.

After opening the hyperlink, at step 502 the mobile device 100 is prompted to add the user pass to the storage of mobile device 100. In an exemplary implementation, the user pass is added to the wallet of mobile device 100. However, the user pass may be added to other financial storage and use applications and solutions for the mobile device 100.

At step 503, the user instructs mobile device 100 to activate the user pass. At step 504, the mobile device 100 transmits a request to pass server 330, requesting activation of the user pass. In an exemplary implementation, the request transmitted by mobile device 100 includes a user information of the user and a unique device identifier of mobile device 100. Pass server 300 may then generate a token that corresponds to the unique device identifier of mobile device 100. In exemplary implementations, the user information transmitted in the request may be a member number or loyalty number of the user. In an exemplary implementation, pass database 340 saves a correspondence between the unique device identifier of mobile device 100 and an account of the user, e.g. a bank server account.

At step 505, the pass server 330 saves a correspondence between token and the user information in the pass database 340.

At step 506, the pass server 330 sends an activation code to the user. In an exemplary implementation, the pass server 330 sends the activation code to the user via the email address provided in the user information. The pass server 330 may send the activation code to mobile device 100 and the user accesses the activation code at mobile device 100. Alternatively, the pass server 330 may send the activation code to the user via text message to the phone number of mobile device 100 stored in pass database 340.

At step 507, the user receives the activation code and enters the activation code to mobile device 100. At step 508, the mobile device 100 sends the token and activation code to pass server 330.

At step 509, the pass server 330 receives the token and activation code. The pass server confirms whether the token received with the activation code match the token provided at step 504 and the activation code provided at step 506. In a case that the pass server 330 confirms that the token and activation code match, the pass server 330 proceeds to step 510. In a case that the token and activation code do not match, the process ends.

In step 510, the pass server 330 pushes a pass update to mobile device 100 to activate the user pass stored by mobile device 100. After receiving the pass update, the user pass stored by mobile device 100 is activated and may be used to perform banking procedures with banking device 200.

FIG. 6 illustrates an authentication process sequence for authenticating a user pass in accordance with the present disclosure. The authentication process begins at step 601, where the user controls mobile device 100 to select the user pass in mobile device 100. In an exemplary implementation, the user opens the wallet or financial app of mobile device 100 and then selects the user pass.

At step 602, the mobile device 100 prompts the user for authentication. The authentication is performed by utilizing the authentication and security protocols of mobile device 100 to verify the identity of the user. In an exemplary implementation, mobile device 100 prompts the user to input biometric information, such as a thumbprint or other fingerprint, a face scan, eye scan, voice comparison or other biometric verification. In other implementations, the mobile device 100 prompts the user to input another security verifier, such as a passcode, pin or password.

Figure 9A:
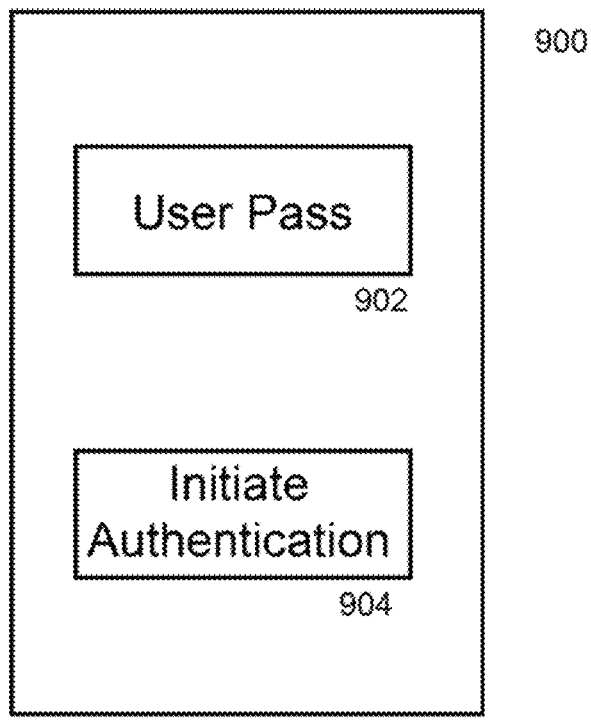
FIG. 9A illustrates a block diagram of an exemplary authentication display of a mobile device in accordance with the present disclosure.
Figure 9B:
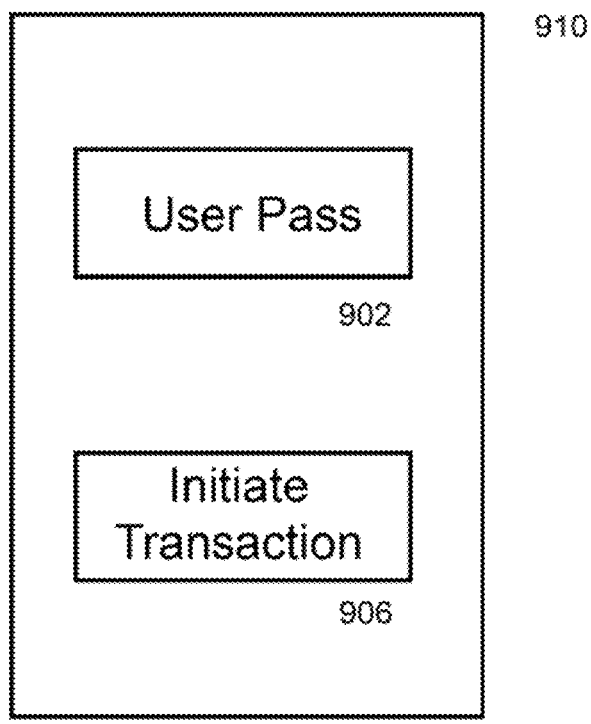
FIG. 9B illustrates a block diagram of an exemplary transaction display of a mobile device in accordance with the present disclosure.

FIG. 9A illustrates a block diagram of an exemplary authentication display of mobile device 100 in accordance with the present disclosure. As shown in FIG. 9A, mobile device 100 outputs display 900, which includes user pass 902 as well as a message to initiate authentication 904. The display of user pass 902 may include a graphic, text including member number, bar code, QR code or other information corresponding to the user pass. An exemplary user pass is illustrated in FIG. 9D. As illustrated in FIG. 9D, display 930 includes user pass 908, which includes a QR code and member number of the user pass.

Once the user is authenticated, mobile device 100 proceeds to step 603. In an exemplary implementation, the user may be prompted that authentication is successful via mobile device 100. For example, mobile device 100 may prompt the user to initiate a transaction. Such is illustrated in FIG. 9B. As shown in FIG. 9B, display 910 includes user pass 902 as well as message 906, which prompts the user to initiate a transaction.

At step 603, mobile device 100 passes user authentication information to banking device 200. In an exemplary implementation, the user authentication information may include user information identifying the authenticated user. The mobile device 100 may also pass a token to banking device 200, the token indicating that the user of mobile device 100 is authenticated and may indicate a unique device identifier of mobile device 100. In an exemplary implementation, mobile device 100 passes the token to banking device 200 via NFC or other direct device-to-device communication. In other implementations, mobile device 100 passes the token to banking device 200 via network 50.

In another implementation, the token is passed to banking device 200 via a scanning procedure. In particular, the user may hold the mobile device 100 in a position for a QR code of the user pass to be scanned by an optical imaging device of peripheral 118 of banking device 200.

Once the token is passed to banking device 200, the process proceeds to step 604. At step 604, banking device 200 sends the token to pass server 330. The token may be transmitted to pass server 330 via network 50.

The pass server 330 receives the token and looks up the user by referring to pass database 340. Pass database 340 stores a correspondence between tokens and user information. By referring to the pass database 340, the pass server 330 acquires the user information corresponding to the token received at step 604.

At step 605, pass server 330 returns a member number of the user to banking device 200 via network 50. The member number is a numerical sequence or other member identifier that corresponds to the user. The member number sent by pass server 330 is part of the user information retrieved from pass database 340.

At step 606, banking device 200 contacts bank server 310 to lookup account information of the user. To do so, banking device 200 transmits the member number to bank server 310. The member number transmitted by banking device 200 corresponds to the member number received from pass server 330 at step 605.

At step 607, bank server 310 returns the account information of the user to banking device 200. The account information sent by bank server 310 to banking device 200 correspond to the member number transmitted at step 606.

After receiving the account information at step 607, a banking procedure may be performed at step 608. Banking device 200 may display an interactive menu to the user. An exemplary interactive menu is illustrated in FIG. 8. As shown in FIG. 8, interactive menu 800 includes a number of banking procedure options for the user. The user may select any of the banking procedures included in interactive menu and complete it via banking device 200, such as deposit, withdrawal, transfer or payment. Bank database 320 is updated once a transaction is completed.

Figure 7A:
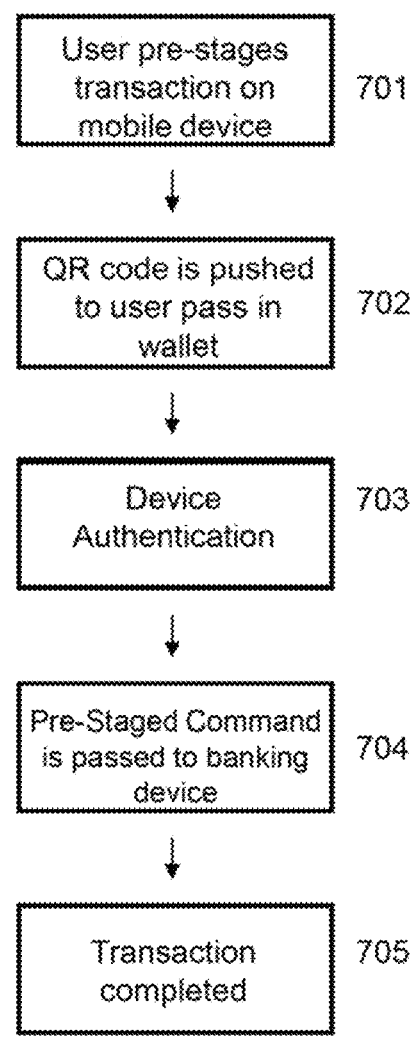
FIG. 7A illustrates a pre-staging transaction completion process in accordance with the present disclosure.

FIGS. 7A and 7B illustrate pre-staging transaction completion processes in accordance with the present disclosure. In particular, FIG. 7A illustrates a pre-staging transaction completion process in which a QR code and transaction details are generated at mobile device 100. FIG. 7B illustrates a pre-staging transaction completion process in which a QR code is generated by pass server 330 and pass server 330 is utilized to confirm details of the transaction.

In FIG. 7A, the pre-staging transaction completion process begins at step 701. In step 701, a user may "pre-stage" a transaction on mobile device 100.

In this disclosure, "pre-staging" a transaction means to prepare a transaction at a time prior to the transaction initialization and completion. In an exemplary implementation, a user may pre-stage a transaction on mobile device 100 by using an application or program corresponding to the bank. By interacting with the application, the user may prepare a transaction to be completed when the user later travels to a bank or other location to interact with banking device 200. In an exemplary implementation, the user controls mobile device 100 to select the user pass in mobile device 100. The user may select details of the transaction to pre-stage, such as transaction type (e.g. withdrawal, deposit, transfer, payment or other), enter an amount for the transaction and/or select a denomination for the transaction. The pre-staging may be directly input to mobile device 100 by the user, or may be automated or received from another user or device. The "pre-staged" transaction will not be completed until the user interacts with banking device 200.

For example, the user may interact with mobile device 100 to pre-stage a transaction to withdraw 100 dollars from his checking account. The pre-staged withdrawal transaction will be completed when the user later interacts with banking device 200.

At step 702, the mobile device 100 generates a QR code corresponding to the pre-staged transaction and pushes the QR code to the user pass in the wallet. In an exemplary implementation, the mobile device 100 generates the QR code corresponding to the pre-staged transaction. The mobile device 100 may provide the QR code to bank cloud 300 after the QR code is generated so that the QR code may be recognized and the transaction may be performed when the user later interacts with banking device 200. In some implementations, the data in the QR Code includes details of a pre-staged transaction (e.g. withdrawal $100 from bank account) or a Unique transaction ID corresponding to transaction details stored by pass server 330 or pass database 340. However, the disclosure is not limited to the generating and pushing of QR codes. In some implementations, the mobile device 100 pushes a bar code, numerical sequence, image or other coded identifier in place of the QR code as corresponding to the pre-staged transaction to the user pass in the wallet.

Figure 9C:
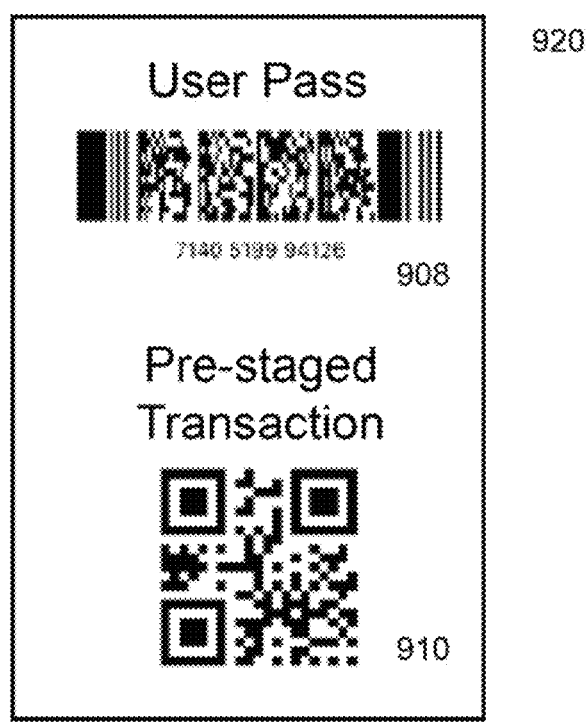
FIG. 9C illustrates a block diagram of an exemplary pre-staged transaction display of a mobile device in accordance with the present disclosure.
Figure 9D:
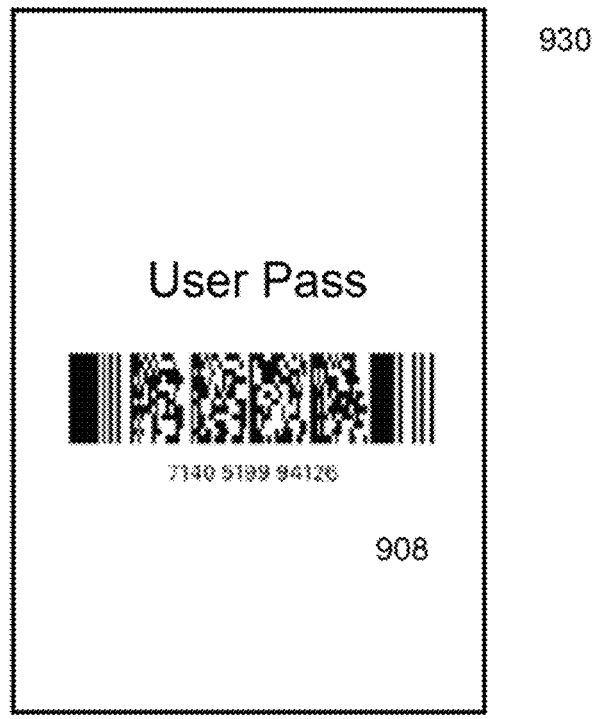
FIG. 9D illustrates a block diagram of another exemplary user pass display of a mobile device in accordance with the present disclosure.
Figure 9E:
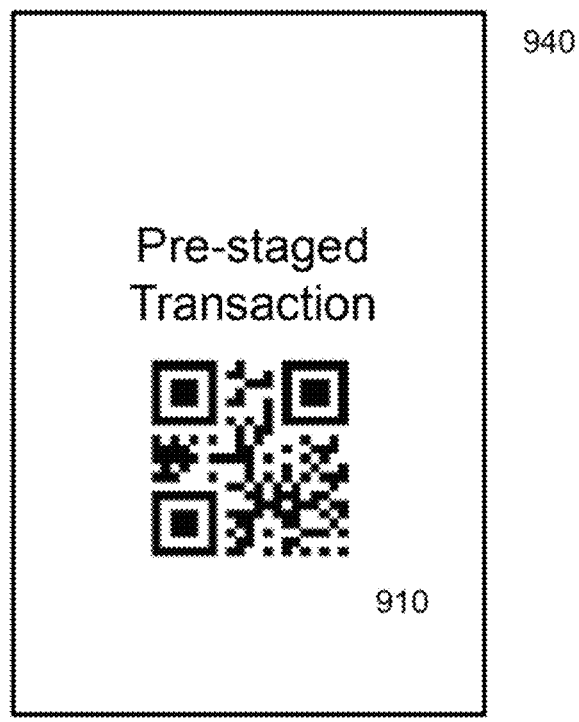
FIG. 9E illustrates a block diagram of another exemplary pre-staged transaction display of a mobile device in accordance with the present disclosure.

FIGS. 9C and 9E illustrate exemplary implementations of QR codes pushed to the user pass of the user. FIG. 9C shows display 920 of mobile device 100, which includes user pass 906 and pre-staged transaction QR code 910. FIG. 9E shows display 940 of mobile device 100, which includes pre-staged transaction QR code 910 without user pass 906.

The process proceeds to step 703 when the user next attempts to interact with banking device 200. While steps 701 and 702 may be performed anywhere, step 703 is performed when the user interacts with banking device 200. After the user interacts with banking device 200, mobile device 100 prompts the user for authentication. The user authentication at step 703 may correspond with the user authentication performed at step 602.

After the user is authenticated at step 703, mobile device 100 passes a pre-staged transaction command to banking device 200 to initiate the pre-staged transaction. The pre-staged transaction command may be transmitted via NFC or other direct device-to-device communication procedure. Alternatively, the pre-staged transaction command may be provided to banking device 200 via a scanning procedure. In particular, the user may hold the mobile device 100 in a position so that the QR code passed to the user pass is scanned by an optical imaging device of peripheral 118 of banking device 200. Once the pre-staged transaction command is received by banking device 200, the process proceeds to step 705.

At step 705, banking device 200 completes the pre-staged transaction. In an exemplary implementation, banking device 200 contacts bank server 310 to confirm the pre-staged transaction. Once pre-staged transaction is confirmed, the pre-staged transaction is completed and bank database 320 is updated. Additional details of steps 704 and 705 will be discussed with reference to steps 750-770 in FIG. 7B.

While the QR code is generated by mobile device 100 in FIG. 7A, the QR code is generated by pass server 330 in the process illustrated in FIG. 7B.

At step 710, the user of mobile device 100 selects details to pre-stage a transaction. The pre-staging at step 710 may correspond with the pre-staging at step 701 in FIG. 7A.

At step 720, the mobile device 100 transmits a token along with transaction information to pass server 330. The transaction information corresponds to the details of the pre-staged transaction from step 710.

At step 730, the pass server 330 generates a QR code for the transaction and corresponding to the token sent at step 720. In some implementations, the QR Code includes details of a pre-staged transaction (e.g. withdrawal $100 from bank account) or a Unique transaction ID corresponding to transaction details stored by pass server 330 or pass database 340. At step 740, the pass server 330 pushes the QR code back to mobile device 100.

The process proceeds to step 750 when the user next attempts to interact with banking device 200. After interacting with banking device 200, step 750 is performed by mobile device 100 authenticating the user, as discussed above with respect to step 602.

After the user is authenticated at step 750, mobile device 100 passes the QR code to banking device 200 at step 760. This step corresponds with step 704 in FIG. 7A.

At step 770, banking device 200 may request transaction confirmation from pass server 330. In some implementations, the QR code may include transaction details. In other implementations, the QR code may include an instruction to contact pass server 330 to request transaction details and/or transaction confirmation. In such implementations, banking device 200 contacts pass server 330 to receive transaction details and/or a confirmation that the transaction is approved at pass server 330. In response, pass server 330 may provide banking device 200 with a response including transaction details and/or confirmation that the pre-staged transaction is approved. In a case that the pre-staged transaction indicated in the QR code is not approved, pass server 330 will not send back details or approval to banking device 200.

Finally, at step 780, the pre-staged transaction may be completed. Banking device 200 may contact components of bank cloud 300 to perform the transaction, sending member information, bank account information or other credentials along with the transaction information to complete the transaction. If the transaction is a withdrawal, money may be dispensed by banking device 200 to the user. If the transaction was a deposit, the banking device 200 may perform a depositing process, receiving money from the user. The transaction may then be posted to bank server 310 and stored in bank database 320.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the disclosure to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A system, comprising:
   a pass server which executes processing in a registration and activation process for executing a banking transaction by a wallet application installed in a mobile device of a user; and
   a banking device including:
   a money handling device to perform a depositing process and a dispensing process; and
   processing circuitry configured to, in the registration and activation process:
   receive via direct device-to-device (D2D) communication, user authentication information from the mobile device of the user interacting with the banking device and with the mobile device, wherein the user authentication information includes a device identifier of the mobile device, the user authentication information indicates that the user has been successfully authenticated by the mobile device, the mobile device is a smart phone with the wallet application is installed, and the wallet application executes a wallet transaction and the banking transaction;
   transmit, in response to reception of the user authentication information, the device identifier to the pass server; and receive a member identifier corresponding to the device identifier from the pass server, wherein the pass server is configured to, in the registration and activation process:
communicate with the banking device and with the mobile device;
store correspondence between the device identifier and user information including the member identifier;
store correspondence between a user pass, account information stored by a bank server different from the pass server, and a wallet identifier of the wallet application, wherein the user pass allows the mobile device to expedite a banking procedure; and
transmit, in response to operation of the wallet application and reception of the device identifier from the banking device, the member identifier of the user corresponding to the device identifier to the banking device, in the registration and activation process, data is processed by the pass server, the banking device, and the mobile device, and the processing circuitry of the banking device is further configured to:
contact the bank server, for the banking transaction corresponding to the wallet application of the user, by transmitting the member identifier for identifying the account information of the user to the bank server;
receive, from the bank server, the account information corresponding to an account of the user, wherein the user corresponds to the member identifier; and
control the money handling device to perform the banking procedure, including the depositing process or the dispensing process, for the banking transaction with the account information, and the money handling device performs the banking procedure in accordance with the member identifier obtained via operating the wallet application.

2. The system according to claim 1, wherein
the processing circuitry is further configured to, prior to contacting the bank server:
receive a pre-staged transaction command from the mobile device via the direct D2D communication;
transmit the pre-staged transaction command to the pass server; and
receive, from the pass server, information indicating the banking transaction to be initiated by the banking device, and
the money handling device performs the banking procedure for the banking transaction based on the information received from the pass server.

3. The system according to claim 2, wherein the processing circuitry is further configured to receive confirmation of the pre-staged transaction command from the pass server.

4. The system according to claim 1, wherein the processing circuitry is further configured to control a display to display an interactive menu including a selectable option for mobile device authentication.

5. The system according to claim 4, wherein the processing circuitry is further configured to
receive a user input to select the option for the mobile device authentication,
transmit a request for the mobile device authentication to the mobile device, and
receive the user authentication information, from the mobile device via the direct D2D communication, in response to transmission of the request.

6. A banking method, comprising:
at a banking device, of a system including the banking device and a pass server which executes processing in a registration and activation process for executing a banking transaction by a wallet application installed in a mobile device of a user, in the registration and activation process:
receiving, by processing circuitry of the banking device via direct device-to-device (D2D) communication, user authentication information from the mobile device of the user interacting with the banking device and with the mobile device, wherein the user authentication information includes a device identifier of the mobile device, the user authentication information indicates that the user has been successfully authenticated by the mobile device, the mobile device is a smart phone with the wallet application is installed, and the wallet application executes a wallet transaction and the banking transaction;
transmitting, in response to reception of the user authentication information, the device identifier to the pass server; and
receiving, in response to transmission of the device identifier, a member identifier corresponding to the device identifier from the pass server;
at the pass server, in the registration and activation process:
communicating with the banking device and with the mobile device;
storing correspondence between the device identifier and user information including the member identifier;
storing correspondence between a user pass, account information stored by a bank server different from the pass server, and a wallet identifier of the wallet application, wherein the user pass allows the mobile device to expedite a banking procedure; and
transmitting, in response to operation of the wallet application and reception of the device identifier from the banking device, the member identifier of the user corresponding to the device identifier to the banking device;
in the registration and activation process, processing data by the pass server, the banking device, and the mobile device; and
at the banking device:
contacting the bank server, for the banking transaction corresponding to the wallet application of the user, by transmitting the member identifier for identifying the account information of the user to the bank server;
receiving, from the bank server, the account information corresponding to an account of the user, wherein the user corresponds to the member identifier; and
controlling a money handling device to perform the banking procedure, including a depositing process or a dispensing process, for the banking transaction with the account information, wherein
the money handling device performs the banking procedure in accordance with the member identifier obtained via operating the wallet application.

7. The banking method according to claim 6, further comprising:
at the banking device prior to contacting the bank server:
receiving a pre-staged transaction command from the mobile device via the direct D2D communication;

transmitting the pre-staged transaction command to the pass server; and receiving, from the pass server, information indicating the banking transaction to be initiated by the banking device, wherein the performing the banking procedure for the banking transaction is based on the information received from the pass server.

8. The system according to claim 1, wherein the mobile device authenticates the user with input biometric information of the user.

9. The banking method according to claim 6, wherein the mobile device authenticates the user with input biometric information of the user.

10. The system according to claim 1, wherein the pass server transmits the user pass to the mobile device, and the mobile device transmits, to the pass server, an activation request to activate the user pass.

11. The system according to claim 10, wherein the user pass corresponds to the account of the user, and the pass server generates the user pass after an identity of the user is authenticated at the bank server.

* * * * *